(12) United States Patent
Nakashima

(10) Patent No.: US 9,405,054 B2
(45) Date of Patent: Aug. 2, 2016

(54) LIGHT GUIDE FILM, BACKLIGHT UNIT FOR ULTRATHIN LIQUID CRYSTAL DISPLAY DEVICE AND MOBILE COMPUTER, AND METHOD FOR PRODUCING LIGHT GUIDE FILM

(71) Applicant: KEIWA INC., Osaka (JP)

(72) Inventor: Hironori Nakashima, Osaka (JP)

(73) Assignee: KEIWA INC., Osaka (JP)

( * ) Notice: Subject to any disclaimer, the term of this patent is extended or adjusted under 35 U.S.C. 154(b) by 0 days.

(21) Appl. No.: 14/227,406

(22) Filed: Mar. 27, 2014

(65) Prior Publication Data

US 2014/0293190 A1    Oct. 2, 2014

(30) Foreign Application Priority Data

Mar. 28, 2013   (JP) .................. 2013-070506

(51) Int. Cl.
| | | |
|---|---|---|
| G02F 1/1335 | (2006.01) | |
| F21V 8/00 | (2006.01) | |
| B29C 47/06 | (2006.01) | |
| B29D 11/00 | (2006.01) | |
| B29C 47/56 | (2006.01) | |
| B29C 47/14 | (2006.01) | |
| B29C 47/00 | (2006.01) | |
| B29C 47/88 | (2006.01) | |

(52) U.S. Cl.
CPC ............ *G02B 6/0035* (2013.01); *B29C 47/065* (2013.01); *B29C 47/14* (2013.01); *B29C 47/56* (2013.01); *B29D 11/00663* (2013.01); *G02B 6/0065* (2013.01); *G02B 6/0093* (2013.01); *B29C 47/0021* (2013.01); *B29C 47/0064* (2013.01); *B29C 47/886* (2013.01); *B29C 47/8845* (2013.01); *G02F 1/133524* (2013.01); *G02F 1/133615* (2013.01); *G02F 2001/133607* (2013.01)

(58) Field of Classification Search
USPC ........................................................ 362/622
See application file for complete search history.

(56) References Cited

U.S. PATENT DOCUMENTS

| | | | |
|---|---|---|---|
| 7,936,517 | B2 | 5/2011 | Cho et al. |
| 2006/0268579 | A1* | 11/2006 | Han et al. .......... 362/629 |
| 2008/0160255 | A1* | 7/2008 | Hsu .................. 428/141 |
| 2009/0040428 | A1* | 2/2009 | Shimura .............. 349/65 |
| 2009/0180053 | A1* | 7/2009 | Song et al. ............ 349/62 |
| 2011/0286242 | A1* | 11/2011 | Ni et al. .............. 362/622 |

FOREIGN PATENT DOCUMENTS

| | | |
|---|---|---|
| CN | 1671992 | 9/2005 |
| CN | 101363937 | 2/2009 |
| CN | 100517021 | 7/2009 |
| CN | 101625428 | 1/2010 |
| CN | 101650451 | 2/2010 |

(Continued)

*Primary Examiner* — Wen-Ying P Chen
(74) *Attorney, Agent, or Firm* — Norris McLaughlin & Marcus, P.A.

(57) ABSTRACT

The present invention relates to a light guide film for a backlight unit of an ultrathin liquid crystal display device, the light guide film allowing rays of light entering from an end face to exit from a front face side, and including a hard layer (17, 18) having a pencil hardness of at least HB, the hard layer (17, 18) containing a polycarbonate as a principal component, and at least one face of the hard layer being exposed, and the entire light guide film (12) having an average thickness of no less than 100 μm and no greater than 600 μm.

13 Claims, 7 Drawing Sheets

(56) References Cited

FOREIGN PATENT DOCUMENTS

| | | |
|---|---|---|
| CN | 102928901 | 2/2013 |
| JP | 10 2010 0088572 | 8/2010 |
| JP | 2010-177130 | 8/2010 |
| JP | 2011-186413 | 9/2011 |
| KR | 2001 0051390 | 6/2001 |
| KR | 10 2012 0077663 | 7/2012 |
| TW | I350383 | 12/1995 |
| TW | 201022338 | 6/2010 |

* cited by examiner

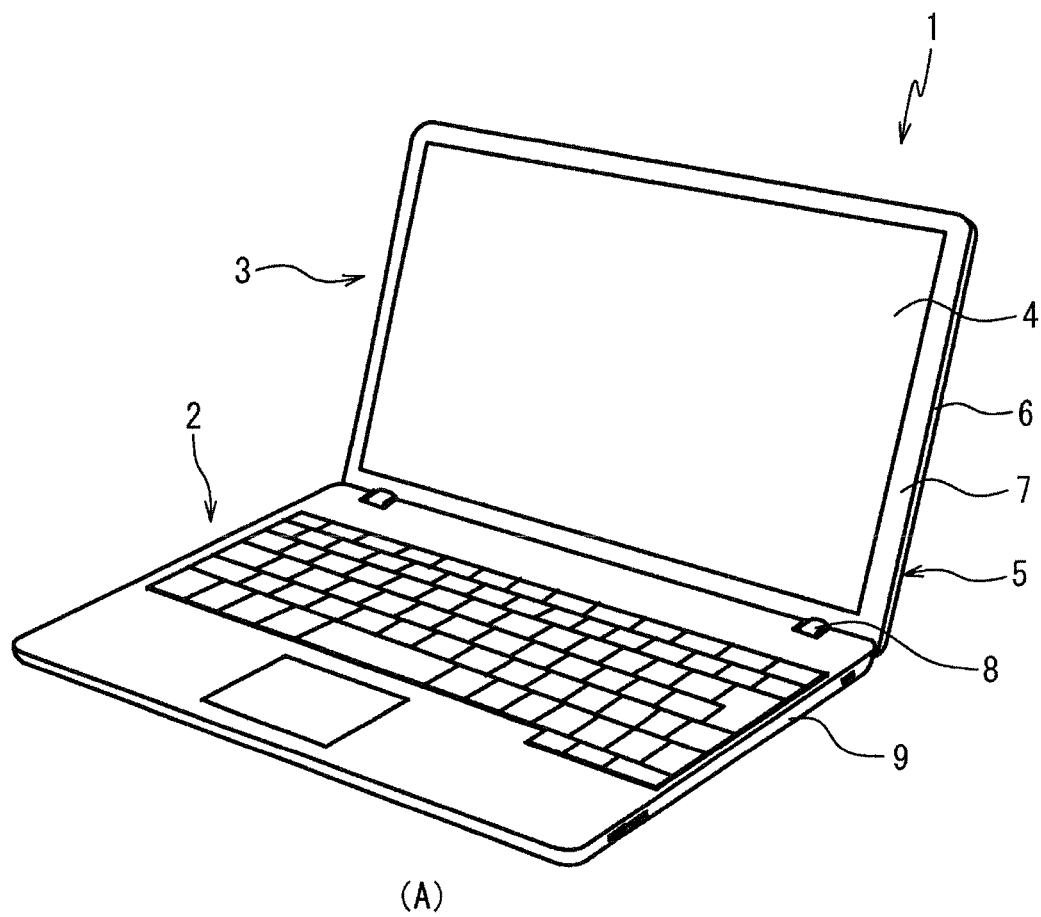
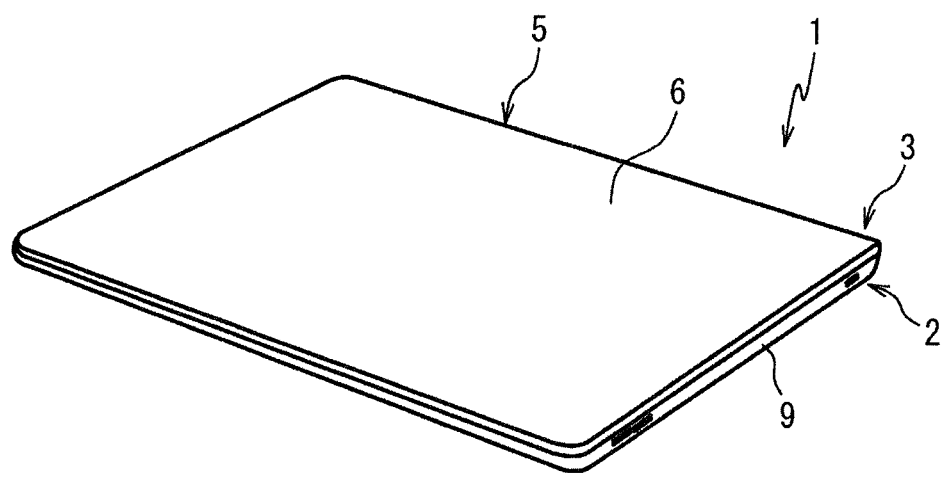
F I G. 1

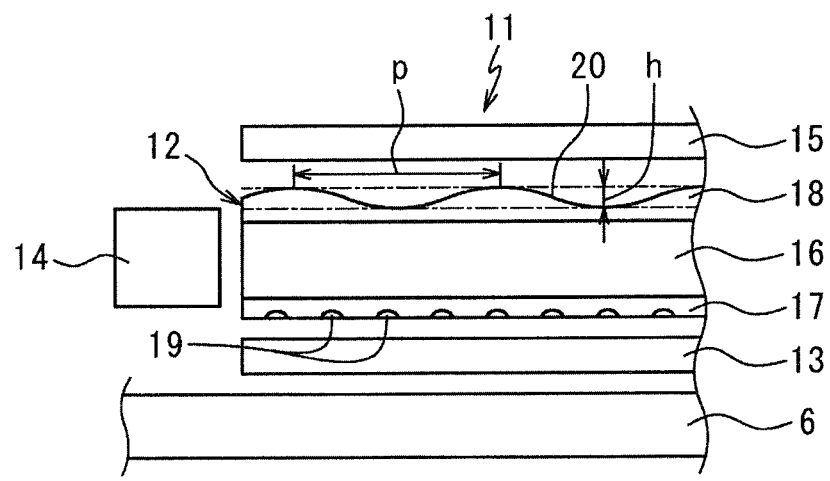
F I G. 2

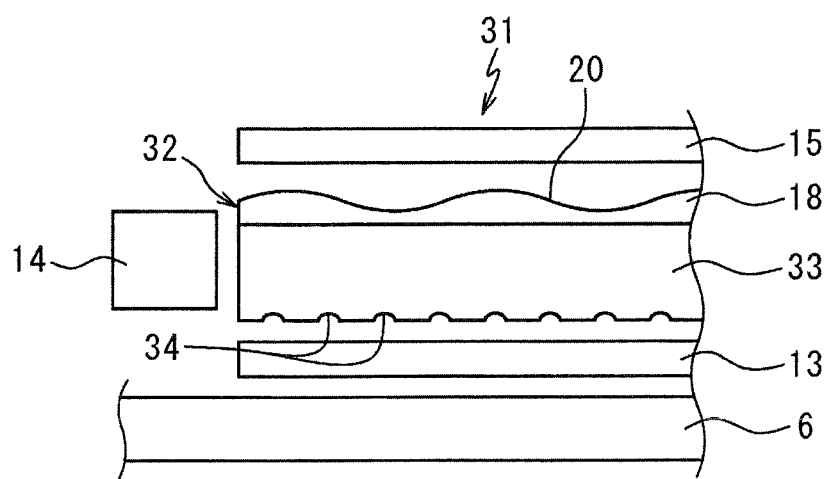
F I G. 4

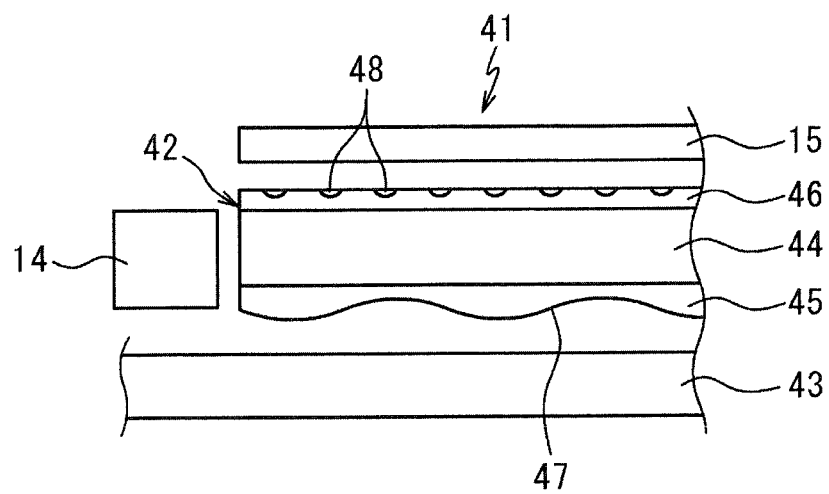
F I G. 5

LIGHT GUIDE FILM, BACKLIGHT UNIT FOR ULTRATHIN LIQUID CRYSTAL DISPLAY DEVICE AND MOBILE COMPUTER, AND METHOD FOR PRODUCING LIGHT GUIDE FILM

BACKGROUND OF THE INVENTION

1. Field of the Invention

The present invention relates to a light guide film, a backlight unit for an ultrathin liquid crystal display device and a mobile computer and a method for producing a light guide film.

2. Discussion of the Background

Liquid crystal display devices in widespread use have been in a backlight system where light emission is executed by illuminating a liquid crystal layer from the rear face. In this system, a backlight unit such as an edge-lit backlight unit or a direct-lit backlight unit is mounted on the underside of the liquid crystal layer. As shown in FIG. 6, such a backlight unit for an ultrathin liquid crystal display device 110 generally includes a top plate 111 disposed on the backmost face of a liquid crystal display unit, a reflection sheet 112 disposed on the front face of the top plate 111, a light guide plate 113 disposed on the front face of the reflection sheet 112, an optical sheet 114 disposed on the front face of the light guide plate 113, and a light source 115 that emits rays of light toward the end face of the light guide plate 113 (see Japanese Unexamined Patent Application, Publication No. 2010-177130). In the backlight unit for an ultrathin liquid crystal display device 110 shown in FIG. 6, rays of light that are emitted from the light source 115 and enter the light guide plate 113 propagate through the light guide plate 113. A part of the propagating rays of light exit from the back face of the light guide plate 113, are reflected on the reflection sheet 112 and enter again the light guide plate 113.

In mobile computers having such a liquid crystal display unit, in order to enhance its portability and user-friendliness, a reduction in thickness and weight is required, leading to a requirement also for a reduction in thickness of the liquid crystal display unit. In particular, in an ultraslim laptop computer referred to as Ultrabook (registered trademark) in which the thickness of the thickest part of its housing is no greater than 21 mm, it is desired that the thickness of the liquid crystal display unit is about 4 mm to 5 mm, and thus, further a reduction in thickness of the backlight unit for an ultrathin liquid crystal display device incorporated into the liquid crystal display unit has been desired.

In regard to the backlight unit for an ultrathin liquid crystal display device of such an ultraslim mobile computer, in addition to the backlight unit having the reflection sheet 112 disposed on the back face of the light guide plate 113 shown in FIG. 6, a backlight unit is also proposed in which a reduction in thickness is attempted, as shown in FIG. 7, by dispensing with the reflection sheet 112 shown in FIG. 6. The backlight unit for an ultrathin liquid crystal display device 210 shown in FIG. 7 includes a metal top plate 211, a light guide plate 213 overlaid on the front face 212 of the top plate 211, an optical sheet 214 overlaid on the front face of the light guide plate 213, and a light source 215 that emits rays of light toward the end face of the light guide plate 213, in which the front face 212 of the top plate 211 is finished by polishing and functions as a reflection surface. In this example, the rays of light that are emitted from the light source 215 and enter the light guide plate 213 propagate through the light guide plate 213, and a part of the propagating rays of light exit from the back face of the light guide plate 213, are reflected on the reflection surface 212 of the top plate 211, and enter again the light guide plate 213. Thus, in the backlight unit for an ultrathin liquid crystal display device 210 shown in FIG. 7, the front face of the top plate 211 corresponds to the reflection surface 212, and therefore the reflection surface 212 can serve as the reflection sheet 112 shown in FIG. 6. Therefore, the backlight unit for an ultrathin liquid crystal display device 210 dispenses with the reflection sheet 112, leading to achievement of a reduction in thickness of the liquid crystal display unit.

Moreover, in such an ultraslim mobile computer, since the thickness of the liquid crystal display unit falls within the above range, the average thickness of the light guide film is required to be no greater than about 600 µm. Thus, a polycarbonate having superior light guiding properties and a predetermined strength, or the like is used as a material for forming such a light guide film.

PRIOR ART DOCUMENTS

Patent Documents

Patent Document 1: Japanese Unexamined Patent Application, Publication No. 2010-177130

SUMMARY OF THE INVENTION

The present inventors found that when such an ultraslim mobile computer is used, a defect arises that luminance of the front face of a liquid crystal display is uneven (lack in uniformity of the luminance). The present inventors thoroughly investigated causes of the defect, and consequently found that the lack in uniformity of the luminance is caused by: (a) rubbing of the front face of the light guide film against the back face of other optical sheet provided on the front face side of the light guide film to form scuffs, leading to diffusion of the rays of light entering the scuffs, and (b) rubbing of the back face of the light guide film against the reflection sheet or the top plate to form scuffs on the back face of the light guide film, leading to diffusion of the rays of light entering the scuffs.

The present invention was made in view of the foregoing circumstances, and an object of the present invention is to provide a light guide film that achieves suppression of lack in uniformity of the luminance on a liquid crystal display surface and a reduction in thickness in a case where the light guide film is used for a backlight unit for an ultrathin liquid crystal display device of an ultraslim mobile computer. Moreover, another object of the present invention is to provide a backlight unit for an ultrathin liquid crystal display device and a mobile computer that achieve suppression of lack in uniformity of the luminance and a reduction in thickness.

According to an aspect of the present invention made for solving the aforementioned problems, there is provided a light guide film for a backlight unit of an ultrathin liquid crystal display device, the light guide film allowing rays of light entering from an end face to exit from a front face side, an entire light guide film having an average thickness of no less than 100 µm and no greater than 600 µm, and the light guide film comprising a hard layer, the hard layer having a pencil hardness of at least HB, comprising a polycarbonate as a principal component, and having at least one face thereof being exposed.

According to the light guide film, scuff resistance of at least one of the front face and the back face of the light guide film is improved by the hard layer containing the polycarbonate as a principal component and having a pencil hardness of at least HB. Therefore, even when an external face of the hard layer of the light guide film is rubbed against other optical sheet such as a light diffusion sheet, or a reflection sheet, the formation of scuffs on the light guide film can be prevented. Therefore, the light guide film enables occurrence of the lack in uniformity of the luminance due to the formation of the scuffs on at least one of the front face side and the back face side to be prevented, while having an average thickness as small as no greater than 600 μm.

It is preferred that the light guide film further includes a soft layer laminated on the hard layer and having a pencil hardness of at most 2B, the soft layer contains a transparent resin as a principal component, and the hard layer has an average thickness of no less than 2 μm and no greater than 100 μm. When the light guide film has such features, the soft layer, which accounts for a most part of the thickness of the light guide film, may be produced using a common inexpensive transparent resin, and only the thin hard layer, which prevents the formation of the scuffs on the light guide film, may be produced using a special polycarbonate having a superior hardness. Thus a reduction of the amount of use of the expensive polycarbonate having a superior hardness is enabled. Therefore, a light guide film exhibiting low lack in uniformity of the luminance can be provided at a low cost.

According to the light guide film, the transparent resin of the soft layer is preferably a polycarbonate. Since such a polycarbonate is widely commercially available and can be obtained at a low cost, the light guide film can be provided at a low cost. Moreover, since both the soft layer and the hard layer contain the polycarbonate as a principal component and have similar refractive indexes, no reflection is brought about inside the light guide film, and rays of light may be guided efficiently. Furthermore, since the aforementioned polycarbonates can be readily welded with each other and less likely to give rise to a defect, the thickness of the light guide film can be reduced.

According to the light guide film, it is preferred that the hard layer and the soft layer are integrally molded by a coextrusion molding process. This enables the light guide film having an average thickness falling within the above range to be easily and reliably provided.

According to the light guide film, the hard layer is preferably laminated on front and back sides of the soft layer. When the light guide film has such a structure, occurrence of the lack in uniformity of the luminance due to the formation of the scuffs on both of the front face side and the back face side of the light guide film can be also prevented.

According to the light guide film, at least one of the front face and the back face preferably has a wave-like modulated surface. When the light guide film has such a structure, light guiding properties and diffusing properties or light emission properties are enhanced by the modulated surface, and a decrease of the luminance of the rays of light that exit from the front face and a decrease of uniformity thereof can be suppressed even when the thickness of the light guide film is as small as no greater than 600 μm. Specifically, in a case where a direction along a ridge line (hereinafter, may be also referred to as "ridge line direction") of the modulated surface of the light guide film and an incident direction of the rays of light are fixed substantially parallel to each other, light guiding properties for the incident rays of light can be improved due to the likeliness of the transmitted rays of light to be condensed along the ridge line direction by virtue of the wave-like modulated surface; and additionally, diffusing properties for the outgoing rays of light can be improved since the rays of light that exit from the front face are diffused to some extent along a direction perpendicular to the ridge line direction through refraction on the wave-like modulated surface. On the other hand, in a case where the ridge line direction of the modulated surface of the light guide film and the incident direction of the rays of light are fixed substantially perpendicular to each other, light emission properties of the front face can be improved due to variation of angles of incidence of the rays of light that enter the front face and/or the back face by virtue of the wave-like modulated surface.

An interval between the ridge lines (hereinafter, may be also referred to as "ridge line interval") of the wave-like modulated surface preferably falls within a range of no less than 1 mm and no greater than 500 mm, and an average height of the ridge line (hereinafter, may be also referred to as "ridge line height") with respect to an approximate hypothetical plane of the wave-like modulated surface on which a plurality of valley lines run preferably falls within a range of no less than 5 μm and no greater than 40 μm. When the ridge line interval and the ridge line height thus fall within the respective above ranges, the aforementioned light guiding properties and diffusing properties or light emission properties can be effectively enhanced.

The light guide film preferably has a diffusion pattern on the back face thereof. This enables the rays of light introduced from the light source to be efficiently diffused by the diffusion pattern and to exit from the front face side.

Moreover, another aspect of the present invention made for solving the aforementioned problems relates to a backlight unit for an ultrathin liquid crystal display device including a reflection sheet, the light guide film according to the aspect of the present invention overlaid on a front face of the reflection sheet, and a light source that emits rays of light toward an end face of the light guide film, as well as a mobile computer including the backlight unit in a liquid crystal display unit.

According to the backlight unit for an ultrathin liquid crystal display device and the mobile computer, the luminance and in-plane uniformity thereof can be enhanced since the light guide film exhibits the light guiding properties and the diffusing properties or the light emission properties as mentioned above. According to the backlight unit for an ultrathin liquid crystal display device, scuff resistance of at least one of the front face and the back face of the light guide film is improved by virtue of the hard layer having a pencil hardness of at least HB. Therefore, even when the hard layer of the light guide film is rubbed against an optical sheet or a reflection sheet, the formation of the scuffs on the light guide film can be prevented. Therefore, in the backlight unit for an ultrathin liquid crystal display device, the occurrence of the lack in uniformity of the luminance caused by the formation of the scuffs on the light guide film can be prevented without securely fixing the light guide film, and accordingly the reduction in thickness can be achieved.

It is to be noted that the term "front face side" as referred to means a display surface side of a liquid crystal display unit. The term "back face side" as referred to means the other side of the display surface of the liquid crystal display unit. The term "average thickness" as referred to means an average of values determined in accordance with A-2 method prescribed in JIS-K-7130, section 5.1.2. The term "pencil hardness" as referred to means a value of pencil scratch hardness defined in section 8.4 in the test method prescribed in JIS K5400.

Moreover, still another aspect of the present invention made for solving the aforementioned problems relates to a method for producing a light guide film for a backlight unit of an ultrathin liquid crystal display device, the light guide film allowing rays of light entering from an end face to exit from a front face side, including:

a coextrusion step of coextruding a soft layer-forming composition for forming a soft layer and a hard layer-forming composition for forming a hard layer, the soft layer comprising a polycarbonate as a principal component and having a pencil hardness of at most 2B, and the hard layer comprising a polycarbonate as a principal component and having a pencil hardness of at least HB, the coextrusion step including adjusting each amount of extrusion of the soft layer-forming composition and the hard layer-forming composition such that an entire light guide film formed through the coextrusion has an average thickness of no less than 100 μm and no greater than 600 μm and the hard layer formed from the hard layer-forming composition has an average thickness of no less than 2 μm and no greater than 100 μm.

Effects of the Invention

As explained in the foregoing, when the light guide film according to the aspect of the present invention is used in a backlight unit for an ultrathin liquid crystal display device of an ultraslim mobile computer, the light guide film allows for suppression of lack in uniformity of the luminance on a liquid crystal display surface as well as a reduction in thickness. Moreover, in the backlight unit for an ultrathin liquid crystal display device and mobile computer according to the aspect of the present invention, the lack in uniformity of the luminance is suppressed and a reduction in thickness is achieved.

BRIEF DESCRIPTION OF THE DRAWINGS

FIG. 1 is a schematic perspective view of a laptop computer according to an embodiment of the present invention: (A) a state in which a liquid crystal display unit is lifted; and (B) a state in which the liquid crystal display unit is closed;

FIG. 2 is a schematic cross sectional view illustrating a backlight unit for an ultrathin liquid crystal display device of the laptop computer shown in FIG. 1;

FIG. 4 is a schematic cross sectional view illustrating a backlight unit for an ultrathin liquid crystal display device according to an embodiment other than the backlight unit shown in FIG. 2;

FIG. 5 is a schematic cross sectional view illustrating a backlight unit for an ultrathin liquid crystal display device according to an embodiment other than the backlight units shown in FIGS. 2 and 4;

DESCRIPTION OF EMBODIMENTS

Figure 3:
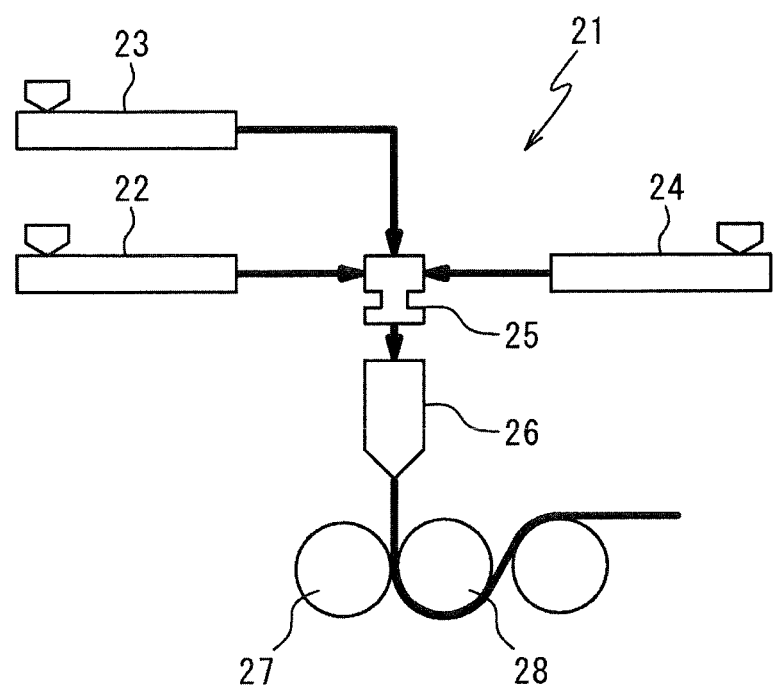
FIG. 3 is a schematic partial enlarged view illustrating an apparatus for manufacturing the light guide film of a backlight unit for an ultrathin liquid crystal display device shown in FIG. 2.
Figure 6:
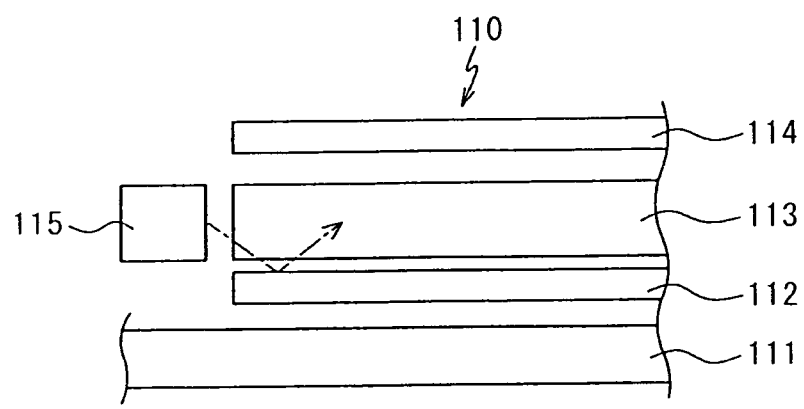
FIG. 6 is a schematic cross sectional view illustrating a conventional backlight unit for an ultrathin liquid crystal display device.
Figure 7:
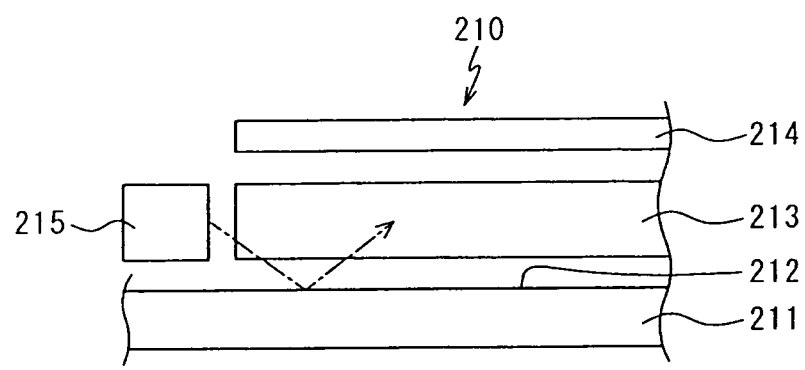
FIG. 7 is a schematic cross sectional view illustrating a conventional backlight unit for an ultrathin liquid crystal display device according to an embodiment other than the embodiment shown in FIG. 6.

Hereinafter, preferred modes for carrying out the invention will be explained in more detail with references to the drawings, if necessary.

First Embodiment

Laptop Computer 1

A laptop computer 1 shown in FIG. 1 includes an operation unit 2, and a liquid crystal display unit 3 rotatably (enabling to be opened/closed) attached to the operation unit 2. A housing of the laptop computer 1 (i.e., a casing that totally accommodates components of the laptop computer 1) has a thickness (at the thickest part (when the liquid crystal display unit 3 is closed)) of no greater than 21 mm, and the laptop computer 1 is generally referred to as Ultrabook (registered trademark) (hereinafter, may be also referred to as "ultraslim computer 1").

The liquid crystal display unit 3 of the ultraslim computer 1 includes a liquid crystal panel 4. The liquid crystal panel 4 is held at the back face, the lateral face and a circumference of the front face by a casing for a liquid crystal display unit 5 of the housing. In this embodiment, the casing for a liquid crystal display unit 5 includes a top plate 6 disposed on the back face (and the rear face) of the liquid crystal panel 4, and a front face support member 7 disposed on the front face side of the circumference of the front face of the liquid crystal panel 4. It is to be noted that the housing of the ultraslim computer 1 includes the casing for a liquid crystal display unit 5, and a casing for an operation unit 9 that is rotatably attached to the casing for a liquid crystal display unit 5 through a hinge part 8 and contains a central processing unit (ultra-low voltage CPU) and the like.

The thickness of the liquid crystal display unit 3 is not particularly limited as long as the housing thickness falls within a desired range, but the upper limit of the thickness of the liquid crystal display unit 3 is preferably 7 mm, more preferably 6 mm, and still more preferably 5 mm. On the other hand, the lower limit of the thickness of the liquid crystal display unit 3 is preferably 2 mm, more preferably 3 mm, and still more preferably 4 mm. When the thickness of the liquid crystal display unit 3 is greater than the above upper limit, it may be difficult to satisfy a requirement of a reduction in thickness of the ultraslim computer 1. Furthermore, when the thickness of the liquid crystal display unit 3 is less than the above lower limit, a decrease in strength and/or in luminance and the like of the liquid crystal display unit 3 may be incurred.

Furthermore, the mobile computer 1 includes an edge-lit backlight unit for an ultrathin liquid crystal display device 11, as shown in FIG. 2, inside the liquid crystal display unit 3.

Backlight Unit 11

The backlight unit 11 includes a light guide film 12; a reflection sheet 13 intervening between the light guide film 12 and the top plate 6; a light source 14 that emits rays of light toward the end face of the light guide film 12; and an optical sheet 15 disposed on the front face of the light guide film 12, as shown in FIG. 2.

The backlight unit 11 emits rays of light from the light source 14 toward the liquid crystal panel 4 as follows. First, the rays of light enter the light guide film 12 from the light source 14, and propagate through the light guide film 12. Then, the rays of light exiting from the back face among the rays of light propagating through the light guide film 12 are reflected on the reflection sheet 13, and enter the light guide film 12 again. In this way, the backlight unit 11 allows the rays of light entering the light guide film 12 from the light source 14 to exit from the front face of the light guide film 12, and to finally enter the back face of the liquid crystal panel 4 through the optical sheet 15.

Light Guide Film 12

The light guide film 12 allows the rays of light entering from the end face to exit from the front face substantially uniformly. The light guide film 12 has a three-layer structure constituted with the soft layer 16, a back hard layer 17 laminated on the back face of the soft layer 16, and a front hard layer 18 laminated on the front face of the soft layer 16, as shown in the Figure. A diffusion pattern 19, which will be described later in detail, is provided on the back face of the back hard layer 17. A wave-like modulated surface 20, which will be described later in detail, is provided on the front face of the front hard layer 18. The light guide film 12 is formed into a plate (non-wedge shape) that is substantially rectangular-shaped in a planar view and has a substantially uniform thickness.

The average thickness of the light guide film 12 falls within a range of no less than 100 μm and no greater than 600 μm. The upper limit of the average thickness of the light guide film 12 is preferably 580 μm, and more preferably 550 μm. On the other hand, the lower limit of the average thickness of the light guide film 12 is preferably 150 μm, and more preferably 200 μm. When the average thickness is greater than the above upper limit, it may be difficult to satisfy a requirement of a reduction in thickness of the backlight unit 11 desired for the ultraslim computer 1. Moreover, when the average thickness is less than the above lower limit, the strength of the light guide film 12 may be insufficient, and a sufficient amount of the rays of light from the light source 14 may not be introduced to the light guide film 12.

Since the soft layer 16 needs to transmit rays of light, the soft layer 16 is formed to be transparent, in particular colorless and transparent. The soft layer 16 is formed from a polycarbonate as a principal component. When the soft layer 16 contains the polycarbonate as a principal component, transparency thereof can be enhanced, and a loss of the rays of light can be reduced. Moreover, since the polycarbonate has a heat resistance, deterioration thereof due to heat generation of the light source 14 is less likely to occur. Furthermore, the polycarbonate has lower water absorbing properties as compared with acrylic resins, and accordingly is superior in dimension accuracy to the acrylic resins.

The polycarbonate is not particularly limited, and may be any one of a linear polycarbonate or a branched polycarbonate, or may be a polycarbonate mixture that contains both of the linear polycarbonate and the branched polycarbonate. An aromatic polycarbonate, which is superior in transparency, impact resistance, flame retardance, dimension accuracy and the like, is preferred for the polycarbonate.

The aromatic polycarbonate is not particularly limited, and may be used either alone, or in combination of two or more thereof. The aromatic polycarbonate is a polymer having a basic structure including a carbonic acid ester bond represented by the general formula —(—O—$X^1$—O—C(=O)—)— (wherein, $X^1$ generally represents a hydrocarbon, and into the hydrocarbon may be incorporated a hetero atom or a hetero bond to impart the desired characteristics). Moreover, the aromatic polycarbonate as referred to means a polycarbonate in which each carbon atom directly bonded to the carbonic acid ester bond is an aromatic carbon.

The aromatic polycarbonate is exemplified by a thermoplastic aromatic polycarbonate polymer that is produced by reacting an aromatic dihydroxy compound with a carbonate precursor. Moreover, a polyhydroxy compound and the like may be reacted in addition to the dihydroxy compound and the carbonate precursor. Furthermore, a method may be employed in which carbon dioxide is used as the carbonate precursor, and is reacted with a cyclic ether. It is to be noted that the aromatic polycarbonate polymer may be a homopolymer, which has only one type of repeating units, or a copolymer that has two or more types of repeating units. Such a copolymer is not particularly limited, and may be selected from various copolymerization systems including a random copolymer, a block copolymer and the like.

Examples of the aromatic dihydroxy compound that may be used as a basic ingredient of the aromatic polycarbonate include: dihydroxybenzenes such as 1,2-dihydroxybenzene, 1,3-dihydroxybenzene and 1,4-dihydroxybenzene; bis(hydroxyaryl)alkanes such as 2,2-bis(4-hydroxyphenyl)propane, bis(4-hydroxyphenyl)methane, 1,1-bis(4-hydroxyphenyl)ethane, 1,1-bis(4-hydroxy-t-butylphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, bis(4-hydroxyphenyl)naphthylmethane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane and 1,1-bis(4-hydroxyphenyl)-3-tert-butyl-cyclohexane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; and the like.

Among these, the bis(hydroxyaryl)alkanes are preferred for the aromatic dihydroxy compound. Moreover, among the bis(hydroxyaryl)alkanes, bis(4-hydroxyphenyl)alkanes are preferred, and 2,2-bis(4-hydroxyphenyl)propane (bisphenol A) is particularly preferred. It is to be noted that the aromatic dihydroxy compound may be used either alone, or in combination of two or more thereof.

Examples of the carbonate precursor that may be used as a basic ingredient of the aromatic polycarbonate include carbonyl halides, carbonate esters, and the like.

Examples of the carbonyl halides include phosgene, haloformates such as bischloroformates of dihydroxy compounds and monochloroformates of dihydroxy compounds, and the like.

Examples of the carbonate esters include diaryl carbonates such as diphenyl carbonate and ditolyl carbonate; dialkyl carbonates such as dimethyl carbonate and diethyl carbonate; carbonates of dihydroxy compounds such as biscarbonates of dihydroxy compounds, monocarbonates of dihydroxy compounds and cyclic carbonates; and the like.

It is to be noted that the carbonate precursor may be used either alone, or in combination of two or more thereof.

A method for production of the aromatic polycarbonate is not particularly limited, and examples thereof include well-known methods such as an interfacial polymerization process, a melt transesterification process, a pyridine process, a ring-opening polymerization process of cyclic carbonate compounds, a process of solid phase transesterification of prepolymers.

Moreover, in the production of the aromatic polycarbonate, a branching agent may be used if necessary. Examples of such a branching agent include 1,1,1-tris(4-hydroxyphenyl)ethane; α,α',α"-tris(4-hydroxyphenyl)-1,3,5-triisopropylbenzene; 1-[α-methyl-α-(4'-hydroxyphenyl)ethyl]-4-[α',α'-bis(4"-hydroxy phenyl)ethyl]benzene; phloroglucin, trimellitic acid, and isatin bis(o-cresol), and the like.

Although a percent branching of the aromatic polycarbonate is not particularly limited, the percent branching preferably falls within a range of no less than 0.5 mol % and no greater than 1.5 mol %. The upper limit of the percent branching of the aromatic polycarbonate is more preferably 1.3 mol %, and still more preferably 1.2 mol %. Moreover, the lower limit of the percent branching of the aromatic polycarbonate is more preferably 0.7 mol %, and still more preferably 0.8 mol %. When the percent branching of the aromatic polycarbonate is greater than the above upper limit, impact resistance and/or transparency thereof may be deteriorated, and additionally moldability of the polycarbonate may be impaired. To the contrary, when the percent branching of the aromatic polycarbonate is less than the above lower limit, melt tension thereof may be deteriorated and flame retardance thereof may be impaired.

The weight average molecular weight (Mw) of the aromatic polycarbonate falls within a range of no less than $2.0 \times 10^4$ and no greater than $5.0 \times 10^4$. The upper limit of the weight average molecular weight (Mw) of the aromatic polycarbonate is more preferably $4.8 \times 10^4$, and still more preferably $4.6 \times 10^4$. Moreover, the lower limit of the weight average molecular weight (Mw) of the aromatic polycarbonate is more preferably $2.2 \times 10^4$, and still more preferably $2.4 \times 10^4$. When the weight average molecular weight (Mw) of the aromatic polycarbonate is greater than the above upper limit, moldability thereof may be impaired. To the contrary, when the weight average molecular weight (Mw) of the aromatic polycarbonate is less than the above lower limit, mechanical strength thereof may be impaired.

The ratio (Mw/Mn) of the polystyrene equivalent weight average molecular weight to the polystyrene equivalent number average molecular weight, as determined by gel permeation chromatography, of the aromatic polycarbonate falls within a range of no less than 1.0 and no greater than 2.5. The upper limit of the ratio (Mw/Mn) of the weight average molecular weight to the number average molecular weight is more preferably 2.3, and still more preferably 2.1. Moreover, the lower limit of the ratio (Mw/Mn) of the weight average molecular weight to the number average molecular weight is more preferably 1.3, and still more preferably 1.5. When the ratio (Mw/Mn) of the weight average molecular weight to the number average molecular weight is greater than the above upper limit, the light transmittance of the aromatic polycarbonate may be deteriorated. To the contrary, when the ratio (Mw/Mn) of the weight average molecular weight to the number average molecular weight is less than the above lower limit, moldability may be impaired. It is to be noted that the ratio (Mw/Mn) of the weight average molecular weight to the number average molecular weight may be determined using "PLGel 5µ MIXED-C" manufactured by Polymer Laboratories as a column, and tetrahydrofuran as a solvent. Moreover, adjustment of the ratio (Mw/Mn) of the weight average molecular weight to the number average molecular weight can be attained by adjusting the amount of a molecular weight modifier used, a timing of addition thereof and the like in the polymerization, or adjusting polymerization conditions such as reaction time and/or reaction temperature.

Although the melt volume flow rate at 300° C. under a load of 1.2 kg of the aromatic polycarbonate is not particularly limited, the melt volume flow rate preferably falls within a range of no less than 15 $cm^3$/10 min and no greater than 80 $cm^3$/10 min. The upper limit of the melt volume flow rate is more preferably 75 $cm^3$/10 min, and still more preferably 70 $cm^3$/10 min. On the other hand, the lower limit of the melt volume flow rate is more preferably 17 $cm^3$/10 min, and still more preferably 20 $cm^3$/10 min. When the melt volume flow rate is greater than the above upper limit, the melt temperature of the aromatic polycarbonate may be lowered, a discharge thereof during melt extrusion molding may vary and moldability thereof may be impaired. To the contrary, when the melt volume flow rate is less than the above lower limit, the melt temperature may be increased, and during the melt extrusion molding, clogging of a filter provided between an extruder and a die may be likely to occur.

The soft layer 16 preferably contains a polystyrene having a weight average molecular weight falling within a range of no less than 1,000 and no greater than 10,000. The weight average molecular weight of the polystyrene falls within a range of more preferably no less than 1,500 and no greater than 8,000, and still more preferably no less than 2,000 and no greater than 5,000. When the weight average molecular weight of the polystyrene is greater than the above upper limit, the light transmittance of the soft layer 16 may be deteriorated.

Moreover, although the amount of the polystyrene contained is not particularly limited, the amount of the polystyrene contained with respect of 100 parts by mass of the aromatic polycarbonate preferably falls within a range of no less than 0.1 parts by mass and no greater than 3 parts by mass. The upper limit of the amount of the polystyrene contained with respect to 100 parts by mass of the aromatic polycarbonate is more preferably 2 parts by mass, and still more preferably 1 part by mass. Moreover, the lower limit of the amount of the polystyrene contained with respect to 100 parts by mass of the aromatic polycarbonate is more preferably 0.2 parts by mass, and still more preferably 0.3 parts by mass. When the amount of the polystyrene contained is greater than the above upper limit, the light transmittance of the soft layer 16 may be deteriorated. To the contrary, when the amount of the polystyrene contained is less than the above lower limit, the effects of improvement of the light transmittance of the soft layer 16 may not be attained.

The soft layer 16 preferably contains a thermoplastic polyacrylic resin. Such a thermoplastic polyacrylic resin is not particularly limited, and examples thereof include polyacrylic acid, polymethyl methacrylate (PMMA), polyacrylonitrile, a n-butyl acrylate-acrylonitrile copolymer, an ethyl acrylate-2-chloroethyl acrylate copolymer, an acrylonitrile-butadiene copolymer, an acrylonitrile-butadiene-styrene copolymer, and the like. Among these, polymethyl methacrylate (PMMA) is particularly preferred.

Although the amount of the thermoplastic polyacrylic resin contained is not particularly limited, the amount of the thermoplastic polyacrylic resin contained with respect to 100 parts by mass of the aromatic polycarbonate preferably falls within a range of no less than 0.01 parts by mass and no greater than 1 part by mass. The upper limit of the amount of the thermoplastic polyacrylic resin contained with respect to 100 parts by mass of the aromatic polycarbonate is more preferably 0.7 parts by mass, and still more preferably 0.5 parts by mass. Moreover, the lower limit of the amount of the thermoplastic polyacrylic resin contained with respect to 100 parts by mass of the aromatic polycarbonate is more preferably 0.03 parts by mass, and still more preferably 0.05 parts by mass. When the amount of the thermoplastic polyacrylic resin contained is greater than the above upper limit, the effects of improvement of the transparency may not be favorably attained, and the spectral light transmittance of the soft layer 16 may not be improved. To the contrary, when the amount of the thermoplastic polyacrylic resin contained is less than the above lower limit, the transparency of the soft layer 16 may be deteriorated.

Moreover, although the molecular weight of the thermoplastic polyacrylic resin is not particularly limited, the molecular weight of the thermoplastic polyacrylic resin preferably falls within a range of no less than 5,000 and no greater than 100,000. The upper limit of the molecular weight of the thermoplastic polyacrylic resin is more preferably 80,000, and still more preferably 60,000. Moreover, the lower limit of the molecular weight of the thermoplastic polyacrylic resin is more preferably 10,000, and still more preferably 20,000. When the molecular weight of the thermoplastic polyacrylic resin falls within the above range, a phase separation upon molding may be suppressed, and transparency of the soft layer 16 may be favorably improved.

The soft layer 16 contains an antioxidant. Although the antioxidant is not particularly limited, examples thereof include hindered phenol compounds, thioether compounds and phosphorus antioxidants. Among these, the hindered phenol compounds are preferred for the antioxidant, and pentaerythritol tetrakis[3-(3,5-di-tert-butyl-4-hydroxyphenyl) propionate] and octadecyl-3-(3,5-di-tert-butyl-4-hydroxyphenyl)propionate are particularly preferred.

The amount of the antioxidant contained with respect to 100 parts by mass of the aromatic polycarbonate falls within a range of no less than 0.01 parts by mass and no greater than 0.1 parts by mass. The upper limit of the amount of the antioxidant contained with respect to 100 parts by mass of the aromatic polycarbonate is more preferably 0.08 parts by mass, and still more preferably 0.07 parts by mass. On the other hand, the lower limit of the amount of the antioxidant contained with respect to 100 parts by mass of the aromatic polycarbonate is more preferably 0.03 parts by mass, and still more preferably 0.04 parts by mass. Even when the amount of the antioxidant contained is greater than the above upper limit, the effects of inclusion of the antioxidant may not be further enhanced beyond a certain level. To the contrary, when the amount of the antioxidant contained is less than the above lower limit, the effects of the inclusion of the antioxidant may not be sufficiently imparted.

It is to be noted that the soft layer 16 may contain an optional component such as an ultraviolet ray absorbing agent, a fire retardant, a stabilizer, a lubricant, a processing aid, a plasticizer, an impact resistance aid, a retardation reducing agent, a delustering agent, an antimicrobial and a fungicide.

Although the spectral light transmittance of the light guide film 12 at a wavelength of 300 nm is not particularly limited, the spectral light transmittance of the light guide film 12 is preferably no less than 65%, more preferably no less than 70%, and still more preferably no less than 73%. When the light guide film 12 has the spectral light transmittance falling within the above range, light guiding properties of the light guide film 12 can be enhanced, and the luminance of the light guide film 12 can be improved. It is to be noted that the light guide film 12 functions so as to permit rays of light having a wavelength in a visible light region to enter the light guide film 12 from the end face and to propagate therethrough. In this regard, although the spectral light transmittance at a wavelength of 300 nm does not directly represent a spectral light transmittance in the visible light region, the spectral light transmittance at a wavelength of 300 nm tends to reflect the spectral light transmittance in the visible light region.

Although the refractive index of the light guide film 12 is not particularly limited, the refractive index of the light guide film 12 falls within a range of preferably no less than 1.56 and no greater than 1.68, and more preferably no less than 1.57 and no greater than 1.66.

The back hard layer 17 is laminated on the back face of the soft layer 16. The back hard layer 17 is a transparent resin layer made from a back hard layer-forming composition containing a polycarbonate as a principal component, and exhibits a small loss of rays of light similarly to the soft layer 16.

However, unlike the soft layer 16, the back hard layer 17 has a pencil hardness of at least HB, preferably at least F, and more preferably at least H. When the pencil hardness of the back hard layer 17 indicates a softer nature than that of the above lower limit, scuffs are likely to be formed on the back face of the light guide film 12, and the scuff may cause the rays of light reflected on the reflection sheet 13 and entering the light guide film 12 again to be scattered in an unexpected manner, leading to a possibility of occurrence of the lack in uniformity of the luminance. Examples of a polycarbonate having a pencil hardness of at least F that may be used as a principal component of the back hard layer-forming composition in order to attain such a superior pencil hardness of the back hard layer 17 include "Iupilon MB6001UR (trademark)" manufactured by Mitsubishi Engineering-Plastics Corporation, and the like.

Although the average thickness of the back hard layer 17 is not particularly limited, the upper limit thereof is preferably 100 μm, and more preferably 50 μm. Moreover, the lower limit of the average thickness of the back hard layer 17 is preferably 2 μm, and more preferably 10 μm. When the average thickness is greater than the above upper limit, the light guide film 12 is so thick that it may be difficult to satisfy a requirement of a reduction in thickness of the backlight unit 11 desired for the ultraslim computer 1. Moreover, when the back hard layer 17 has an average thickness greater than the above upper limit, the back hard layer 17 may be too costly in consideration of the effects thereof since the polycarbonate having a superior surface hardness, which is a principal component of the back hard layer-forming composition, is comparatively expensive. On the other hand, when the average thickness is less than the above lower limit, the back hard layer 17 is so thin that sufficient surface strength may not be exhibited.

When the arithmetic average roughness (Ra) of the back face of the back hard layer 17 falls within a range of no less than 0.04 μm and no greater than 0.3 μm, a loss of rays of light due to scattering and/or reflection of the rays of light can be suppressed and additionally the occurrence of the lack in uniformity of the luminance can be prevented.

A diffusion pattern 19 having light scattering portions for scattering rays of light is provided on the back face (outer surface) of the back hard layer 17. The diffusion pattern 19 is formed to be colored through, for example, laser irradiation. Specifically, the light scattering portions are formed by incorporating a coloring agent into the back hard layer-forming composition, and irradiating desired areas on the formed back hard layer 17 with a laser to allow the coloring agent to develop a color.

The diffusion pattern 19 is formed in a scattered dot-like disposition pattern in a planar view (a drawing in a planar view is not shown). The disposition pattern of the diffusion pattern 19 is provided so as to allow the rays of light to exit uniformly from the front face of the light guide film 12 (i.e., the front face of the front hard layer). Specifically, the light scattering portions of the diffusion pattern 19 are formed such that the proportion of the light scattering portions is low at a position near the light source 14 and increases with an increasing distance from the light source 14. It is to be noted that the proportion of the light scattering portions in the diffusion pattern 19 can be adjusted by changing the number of the light scattering portions with an identical size of the respective light scattering portions, or by changing the size of the respective light scattering portions.

The coloring agent dispersed in the back hard layer-forming composition is a pigment that changes its color upon laser irradiation. Well-known organic and inorganic substances used as a laser marking agent can be used for the coloring agent. Specifically, examples of the coloring agent include: yellow iron oxide; inorganic lead compounds; manganese violet; cobalt violet; compounds of a metal such as mercury, cobalt, copper, bismuth and nickel; pearlescent pigments; silicon compounds; micas; kaolins; silica sand; diatomaceous earth; talc; and the like. These may be used either alone, or in combination of two or more thereof. However, since formation of a reflecting pattern that reflects rays of light in the light guide film 12 is intended through laser irradiation, it is preferred for a dot shape or the like that constitutes the reflection pattern to have a color that reflects rays of light. Therefore, it is preferred to incorporate into the light guide film 12 a coloring agent that develops a white color upon laser irradiation, whereas, to the contrary, coloring agents that are carbonized upon the laser irradiation and turn to black which absorbs rays of light are unsuitable for the present invention. Examples of such a coloring agent that develops a white color include titan black, cordierite, mica, and the like.

In addition to inorganic compounds represented by the composition formula of $Mg_2Al_3(AlSi_5O_{18})$, analogs thereof in which a part of Mg is replaced with Fe can be used as the cordierite. Alternatively, moisture-containing cordierite can be also used.

Natural micas such as muscovite, phlogopite, biotite and sericite, and synthetic micas such as fluorphlogopite and tetrasilicic fluorine mica can be used as the mica.

The content of the coloring agent in the back hard layer-forming composition falls within a range of preferably no less than 0.0001% by mass and no greater than 2.5% by mass, and more preferably no less than 0.1% by mass and no greater than 1% by mass. When the content of the coloring agent is less than the above lower limit, sufficient color development effects may not be exerted upon the laser irradiation, and therefore a desired reflection pattern may not be formed. To the contrary, when the content of the coloring agent is beyond the above upper limit, the degree of transparency, the mechanical strength and the like of the back hard layer 17 may be impaired.

The shape of the respective light scattering portions 14 of the diffusion pattern 19 in a planar view may be linear, elliptical, rectangular, or the like. In addition, the size of the respective light scattering portions (in a planar view) is not particularly limited, but for example, the maximum width thereof is preferably no greater than 1 mm, and more preferably no greater than 0.5 mm. Furthermore, the light scattering portions may have a three-dimensional shape having a height in the sheet-thickness direction.

A laser used for irradiation of the back hard layer 17 is not particularly limited, and for example, a carbon dioxide laser, a carbon monoxide laser, a semiconductor laser, a YAG (yttrium-aluminum-garnet) laser and the like may be used. Among these, a carbon dioxide laser is suitable for forming a fine dot pattern, since the carbon dioxide laser produces beams having a wavelength of 9.3 μm to 10.6 μm. A transversely excited atmospheric (TEA) type, a continuous oscillation type, and a repetitively pulsed carbon dioxide laser and the like may be used as the carbon dioxide laser.

It is to be noted that the diffusion pattern 19 may not necessarily be formed through color development of the coloring agent through the laser irradiation. The diffusion pattern 19 of the light guide film 12 may be, for example, a pattern formed by directly processing the front face of the back hard layer 17 with a laser to provide a dot pattern, a stripe pattern or the like, or a pattern formed by hardening an ink applied through screen printing, ink jet printing, vapor deposition or the like.

The front hard layer 18 is laminated on the front face of the soft layer 16. The front hard layer 18 is a transparent resin layer made from a front hard layer-forming composition containing a polycarbonate as a principal component, similarly to the back hard layer 17; however, unlike the back hard layer 17, the front hard layer 18 includes no light scattering portion, and instead includes a wave-like modulated surface 20 on the front face thereof.

The polycarbonate that may be used as a principal component of the front hard layer-forming composition is similar to the polycarbonate that may be used as the principal component of the back hard layer-forming composition. Further, the front hard layer-forming composition may be: a composition having a formulation completely identical to that of the back hard layer-forming composition; a composition differing from the back hard layer-forming composition in terms of a blend ratio of the polycarbonate and the additives; or another composition containing as a principal component a polycarbonate differing from the polycarbonate contained in the back hard layer-forming composition. For example, the front hard layer-forming composition may be a formulation identical to the back hard layer-forming composition except that the coloring agent for forming the diffusion pattern 19 is not incorporated.

The front hard layer 18 has a pencil hardness of at least HB, preferably at least F, and more preferably at least H. When the pencil hardness of the front hard layer 18 indicates a softer nature than that of the above hardness, scuffs are likely to be formed on the front face of the light guide film 12, and the scuff may cause the rays of light exiting from the light guide film 12 to be scattered, leading to a possibility of occurrence of the lack in uniformity of the luminance. Moreover, in regard to the average thickness of the front hard layer 18, the upper limit thereof is preferably 100 μm, and more preferably 50 μm, whereas the lower limit thereof is preferably 2 μm, and more preferably 10 μm, for the same reasons as for the back hard layer 17. The arithmetic average roughness (Ra) of the back face of the front hard layer 18 also preferably falls within a range of no less than 0.04 μm and no greater than 0.3 μm, similarly to the back hard layer 17.

The front hard layer 18 has a wave-like modulated surface 20 on the front face thereof. Moreover, a ridge line direction of the modulated surface 20 is substantially perpendicular to the end face of the light guide film 12 where the rays of light from the light source 14 enter. Accordingly, when the rays of light propagating through the light guide film 12 are reflected on the front face, a travelling direction of a part of the rays of light is shifted to a ridge line side of the wave-like modulated surface 20, whereby the rays of light are likely to be condensed along the ridge line direction. Moreover, in addition to this advantage, the rays of light that exit from the front face are diffused to some extent along a direction perpendicular to the ridge line direction of the wave-like modulated surface 20 through refraction on the wave-like modulated surface 20, whereby the diffusing properties of the outgoing rays of light may be improved.

Although the ridge line interval p of the wave-like modulated surface 20 is not particularly limited, the ridge line interval p preferably falls within a range of no less than 1 mm and no greater than 500 mm. The upper limit of the ridge line interval p is more preferably 100 mm, and still more preferably 60 mm. On the other hand, the lower limit of the ridge line interval p is more preferably 10 mm, and still more preferably 20 mm. When the ridge line interval p does not fall within the above range, the rays of light propagating through the light guide film 12 are difficult to be condensed along the ridge line direction. It is to be noted that although all of the ridge line intervals p of the modulated surface 20 preferably fall within the above range, a part of the plurality of ridge line intervals p of the modulated surface 20 may not fall within the above range, and in this case, no less than 50%, preferably no less than 70%, of the plurality of ridge line intervals may fall within the above range.

Moreover, although the average height h of the ridge line with respect to an approximate hypothetical plane of the wave-like modulated surface 20 on which a plurality of valley lines run is not particularly limited, the average height h preferably falls within a range of no less than 5 µm and no greater than 40 µm. The upper limit of the average height h is more preferably 20 µm, and still more preferably 15 µm. On the other hand, the lower limit of the average height h is more preferably 7 µm, and still more preferably 9 µm. When the average height h does not fall within the above range, the rays of light propagating through the light guide film 12 are less likely to be condensed along the ridge line direction.

Reflection Sheet 13

The reflection sheet 13 is disposed between the light guide film 12 and the top plate 6. The reflection sheet 13 reflects the rays of light exiting from the back face side of the light guide film 12 toward the front face side. The reflection sheet 13 is exemplified by: a white sheet in which a filler is contained in a dispersion state in a base resin such as a polyester resin; a mirror sheet obtained by vapor deposition of a metal such as aluminum and silver on the front face of a film made of a polyester or the like to enhance regular reflection properties; and the like. Of these, the mirror sheet is preferred for the reflection sheet 13, since the rays of light reflected on the mirror sheet do not contain diffusively reflected components.

Top Plate 6

The top plate 6 is formed from a metal plate, and specifically, a plate made of an aluminum alloy. In this embodiment, the thickness of the plate falls within a range of preferably no less than 500 µm and no greater than 1,200 µm, and more preferably no less than 700 µm and no greater than 900 µm. In addition, the top plate 6 is formed such that the circumference of the plate is curved toward the front face side, and this curved portion functions as a rib, whereby the top plate 6 has a sufficient strength. It is to be noted that although a portion (central portion) other than the curved portion as the rib has a flat face, the central portion may be embossed with a pattern such as a geometrical pattern.

Light Source 14

The light source 14 is contained in the casing for a liquid crystal display unit 5, and disposed such that an emission surface faces to (or abuts) the end face of the soft layer 16 of the light guide film 12. Various types of light sources can be used as the light source 14, and for example, a light emitting diode (LED) can be used as the light source 14. Specifically, a light source in which a plurality of light emitting diodes are disposed along the end face of the soft layer 16 may be used as the light source 14.

In the backlight unit 11, the following systems may be employed such as: a unilateral edge-lit system in which the light source 14 is disposed along only one side edge of the light guide film 12; a bilateral edge-lit system in which the light source 14 is disposed along each of the opposite side edges of the light guide film 12; and the like.

Optical Sheet 15

The optical sheet 15 is a sheet disposed on the front face side of a light guide plate and having a specific optical function. The optical sheet 15 is, for example, a light diffusion sheet having a light diffusion function or a prism sheet for refracting diffused rays of light in a normal direction; and the optical sheet 15 may be a single form or a laminate of the light diffusion sheet and/or the prism sheet, or may be integrally formed with the back face of the liquid crystal panel 4.

Method for Production of Light Guide Film 12

Next, with reference to FIG. 3, a method for production of the light guide film 12 will be explained. The method for production of the light guide film 12 includes a first step of preparing each of the soft layer-forming composition for forming the soft layer 16, the back hard layer-forming composition for forming the back hard layer 17, and the front hard layer-forming composition for forming the front hard layer 18; a second step (coextrusion step) of providing the soft layer 16, the back hard layer 17 and the front hard layer 18 in the form of an integrated sheet by a coextrusion molding process in which the soft layer-forming composition, the back hard layer-forming composition and the front hard layer-forming composition each prepared in the first step are extruded at the same time in a molten state; and a third step of irradiating the back hard layer 17 provided in the second step with a laser to form the diffusion pattern 19 on the back hard layer 17.

In the first step, the aforementioned polycarbonate having a pencil hardness of at most 2B or the aforementioned polycarbonate having a pencil hardness of at least HB are blended with an ultraviolet ray absorbing agent, a stabilizer, a lubricant, a processing aid, a plasticizer, an impact resistance aid, a retardation reducing agent, an antimicrobial, a fungicide, and the like, respectively as needed, to prepare each of the soft layer-forming composition, the back hard layer-forming composition and the front hard layer-forming composition. Moreover, the coloring agent for forming the aforementioned diffusion pattern 19 is incorporated into the back hard layer-forming composition.

The second step is carried out by the coextrusion molding process using a coextruder 21 shown in FIG. 3. The coextruder 21 includes extruders 22, 23, 24, and a distribution block 25, a multi-manifold die (T die) 26, and a pair of pressure rolls 27, 28.

In the second step, the front hard layer-forming composition is charged into the extruder 22, the soft layer-forming composition is charged into the extruder 23, and the back hard layer-forming composition is charged into the extruder 24. The front hard layer-forming composition, the soft layer-forming composition and the back hard layer-forming composition extruded in a molten state from the extruders 22, 23, 24, respectively, are distributed through the distribution block 25, thereafter are extruded from the multi-manifold die into a form of three molten films running parallel to one another, and are overlaid on one another. This three-layered film form is sandwiched between the pressure rolls 27, 28 for pressure welding and cooled, whereby a film is formed in which the back hard layer 17, the soft layer 16 and the front hard layer 18 are integrally welded.

In the second step, the thickness of each of the soft layer 16, the back hard layer 17 and the front hard layer 18 is adjusted by adjusting an amount of each of the soft layer-forming composition, the back hard layer-forming composition and the front hard layer-forming composition extruded from the extruders 23, 24, 22, respectively. In this procedure, the amount of the back hard layer-forming composition and the front hard layer-forming composition extruded from the extruders 22, 24 is adjusted such that the back hard layer 17 and the front hard layer 18 have the desired average thickness falling within a range of no less than 2 µm and no greater than 100 µm, as mentioned above. In addition, the amount of the soft layer-forming composition extruded from the extruder 23 is adjusted such that the entire light guide film 12 has the desired average thickness falling within a range of no less than 100 µm and no greater than 600 µm, as mentioned above. Moreover, in a case where the cross-sectional shape of a slit of the multi-manifold die 26 through which the front hard layer-forming composition is extruded coincides with a reversed shape of the modulated surface 20, the wave-like modulated surface 20 can be formed on the front face of the front hard layer 18 in the second step.

In the third step, the back hard layer 17 is irradiated with a laser in a scattered dot-like manner to form the diffusion pattern 19 as mentioned above.

Advantages

In the backlight unit 11 of the ultraslim computer 1 according to the embodiment of the present invention, the light guide film 12 includes, on the back face and the front face of the soft layer 16, the back hard layer 17 and the front hard layer 18 both containing as a principal component the polycarbonate having a superior surface hardness; therefore, scuffs are unlikely to be formed easily on the front hard layer 18 and the back hard layer 17 provided on the front face and the back face of the light guide film 12, even when the light guide film 12 is rubbed against the reflection sheet 13 or the optical sheet 15 while the ultraslim computer 1 is carried, for example. In other words, the light guide film 12 is resistant to scuffs that give rise to the lack in uniformity of the luminance, whereby uniformity of the luminance of liquid crystal panel 4 is maintained. In particular, the wave-like modulated surface 20 is formed from the front hard layer 18, which has superior hardness, and therefore even when the light guide film 12 is rubbed against the optical sheet 15, scuffs are unlikely to be formed on the modulated surface 20, whereby favorable light emission properties of the light guide film 12 can be maintained.

Moreover, the light guide film 12 is formed by laminating the soft layer 16, the back hard layer 17 and the front hard layer 18 each containing the polycarbonate as a principal component. Accordingly, no reflection is brought about inside the light guide film 12, and rays of light can be efficiently guided. Moreover, since superior adhesiveness is achieved between the soft layer 16 and the back hard layer 17 or the front hard layer 18 each having a similar composition, the light guide film 12 can be formed into a uniform and thin sheet form. In particular, the light guide film 12 can be formed into a thin sheet through coextrusion, and production costs may be kept comparatively low. Moreover, in the light guide film 12, since a cheap and common polycarbonate is principally used to form a thick soft layer 16 and an expensive polycarbonate having a superior hardness is used to form only the thin back hard layer 17 and the thin front hard layer 18, formation of the scuffs leading to the lack in uniformity of the luminance can be prevented at a lowest cost.

Thus, the light guide film 12 that is thin and unlikely to be scuffed enables a reduction in thickness of the backlight unit 11 and, in turn, the ultraslim computer 1 to be facilitated. Additionally, the light guide film 12 raises the cost marginally as compared with conventional products, while achieving superior uniformity of luminance of the liquid crystal display unit 3.

Second Embodiment

Backlight Unit 31

A backlight unit for an ultrathin liquid crystal display device 31 shown in FIG. 4 is used, in place of the backlight unit 11 shown in FIG. 2, as an edge-lit backlight unit for an ultrathin liquid crystal display device of a liquid crystal display unit of a laptop computer in which a housing thereof has a thickness of no greater than 21 mm.

The backlight unit 31 includes a light guide film 32, a reflection sheet 13 disposed on the back face of the light guide film 32, a light source 14 that emits rays of light toward the end face of the light guide film 32, and an optical sheet 15 disposed on the front face of the light guide film 32. The reflection sheet 13, the light source 14 and the optical sheet 15 are similar to those in the backlight unit 11 shown in FIG. 2, and therefore explanation thereof will be omitted through designating the identical number.

Light Guide Film 32

The light guide film 32 allows the rays of light entering from the end face to exit from the front face substantially uniformly. The light guide film 32 has a two-layer structure constituted with a soft layer 33 containing the polycarbonate as a principal component and having a pencil hardness of at most 2B, and a front hard layer 18 laminated on the front face of the soft layer 33. A diffusion pattern 34 is formed on the back face of the soft layer 33. The front hard layer 18 is similar to that of the light guide film 12 shown in FIG. 2, and therefore explanation thereof will be omitted through designating the identical number. Moreover, a soft layer-forming composition for forming the soft layer 33 is also similar to the soft layer-forming composition for forming the soft layer 16 of the light guide film 12 shown in FIG. 2, and detailed explanation thereof will be omitted.

The diffusion pattern 34 has a plurality of depressions formed on the back face of the soft layer 33 in a scattered dot-like manner. The plurality of depressions are disposed such that rays of light can be allowed to exit uniformly from the front face of the light guide film 32. Although the average diameter of the depressions is not particularly limited, the average diameter of the depressions is preferably no greater than 50 µm. The upper limit of the average diameter of the depressions is more preferably 40 µm, and still more preferably 30 µm. On the other hand, the lower limit of the average diameter of the depressions preferably 0.5 µm, more preferably 1 µm, and still more preferably 5 µm. When the average diameter of the depressions is beyond the above upper limit, the lack in uniformity of the luminance may be brought about, and the height of the depression may be increased, whereby facilitation of the reduction in thickness of the light guide film 12 may be difficult. To the contrary, when the average diameter of the depressions is less than the above lower limit, the light scattering effect may not be achieved sufficiently. It is to be noted that the term "diameter" as referred to means the median value of the maximum width of a contour and the width of the contour along a direction perpendicular to the maximum width direction thereof. Furthermore, the term "average diameter" as referred to means an average of the respective diameters of the plurality of depressions.

Although the shape of the depression is not particularly limited, the shape of the depressions may be semi-spherical, conular, cylindrical, polygonal pyramidal, polygonal columnar, ungual, or the like. Among these, the depressions are preferably formed to have a semi-spherical shape. When the depressions are formed to have a semi-spherical shape, moldability of the light guide film 32 can be improved, formation of a protruding edge can be prevented, and additionally the reduction in thickness can be facilitated.

Method for Production of Light Guide Film 32

In the light guide film 32, the diffusion pattern 34 is formed in a coextrusion step. The coextrusion step is carried out by using the same coextruder 21 as in the first embodiment and providing a pressure roll 28 as a reverse mold having a reversed pattern of the diffusion pattern 34 on the surface thereof. More specifically, in the coextrusion step, the diffusion pattern 34 can be formed on the back face of the soft layer 33 by transferring the reversed pattern provided on the surface of the pressure roll 28 to the soft layer 33 before the soft layer-forming composition is hardened.

Advantages

Moreover, in the backlight unit 31 of the ultraslim computer 1, although the soft layer 33 is exposed at the back face of the light guide film 32, scuffs on the back face of the light guide film 32 have a smaller effect on the lack in uniformity of the luminance of liquid crystal panel 4 as compared with scuffs on the front face of the light guide film 32. Thus, the configuration according to this embodiment can exert, in contrast to conventional light guide films, at least reasonable effects of suppressing the lack in uniformity of the luminance at a minimal increase in cost.

Third Embodiment

Backlight Unit 41

A backlight unit 41 includes a light guide film 42; a top plate 43 of a casing for a liquid crystal display unit, the light guide film 42 being directly disposed on the front face of the top plate 43; a light source 14 that emits rays of light toward the end face of the light guide film 42; and an optical sheet 15 disposed on the front face of the light guide film 42. The light source 14 and the optical sheet 15 are similar to those of the backlight unit 11 shown in FIG. 2 and the backlight unit 31 shown in FIG. 4, and therefore explanation thereof will be omitted through designating the identical number.

The inner face of the top plate 43 is mirror-finished so as to reflect rays of light, and the top plate 43 also functions as the reflection sheet 13 shown in FIG. 2. Thus, in the backlight unit 41, the light guide film 42 is directly overlaid on the front face of the top plate 43.

Light Guide Film 42

The light guide film 42 allows the rays of light entering from the end face to exit from the front face substantially uniformly. The light guide film 42 has a three-layer structure constituted with a soft layer 44; a back hard layer 45 laminated on the back face of the soft layer 44; and a front hard layer 46 laminated on the front face of the soft layer 44. A wave-like modulated surface 47 is provided on the back face of the back hard layer 45, and a diffusion pattern 48 is provided on the front face of the front hard layer 46.

This light guide film 42 may be regarded as a light guide film having a reverse configuration of the light guide film 12 shown in FIG. 2. Therefore, the soft layer 44, the back hard layer 45, the front hard layer 46, the wave-like modulated surface 47 and the diffusion pattern 48 of the light guide film 42 shown in FIG. 5 are constituted similarly to the soft layer 16, the back hard layer 17, the front hard layer 18, the wave-like modulated surface 20 and the diffusion pattern 19 of the light guide film 12 shown in FIG. 2, respectively, and therefore detailed explanation will be omitted.

Advantages

In the backlight unit 41, since the light guide film 42 is overlaid on the front face of the top plate 43, the rays of light exiting from the back face side of the light guide film 42 are reflected on the front face of the top plate 43 and enter the light guide film 42 again. Accordingly, the backlight unit 41 allows for the reduction in thickness, since the backlight unit 41 does not include any conventional reflection sheet.

The light guide film 42 has the modulated surface 47 on the back face thereof. Thus, when the rays of light propagating through the light guide film 42 are reflected on the back face of the light guide film 42, a travelling direction of a part of the rays of light is shifted to a ridge line side of the wave-like modulated surface 47, whereby the rays of light are likely to be condensed along the ridge line direction. Moreover, in addition to this advantage, the rays of light that exit from the front face are diffused to some extent along a direction perpendicular to the ridge line direction of the wave-like modulated surface 47 through refraction on the wave-like modulated surface 47, whereby the diffusing properties of the rays of light that are reflected on the top plate 43 and enter the light guide film 42 again may be improved.

Moreover, the light guide film 42 has a diffusion pattern 48 on the front face thereof. Thus, the rays of light exiting from the front face side are diffused by the diffusion pattern 48, whereby favorable light emission characteristics can be achieved.

Other Embodiments

In addition, the light guide film, the backlight unit for an ultrathin liquid crystal display device and the mobile computer of the present invention may be exploited in various modified or improved embodiments other than those as described above. Accordingly, a component of the aforementioned respective embodiments may be substituted with a component of other embodiments or a well-known equivalent component. For example, the light guide film may be a monolayer sheet constituted with only a hard layer containing the polycarbonate as a principal component and having a pencil hardness of at least HB. Moreover, in a case where the light guide film is most unlikely to be rubbed against the optical sheet disposed on the front face of the light guide film, and the like, the hard layer on the front face side of the soft layer may be omitted, and the hard layer may be provided only on the back face side abutting on the reflection sheet. Moreover, also in a case where the diffusion pattern is provided on the hard layer, the diffusion pattern may be formed in the extrusion step by die stamping, and also in a case where the diffusion pattern is formed on the soft layer, the coloring agent incorporated into the soft layer-forming composition may be permitted to develop a color by laser irradiation to form the diffusion pattern. In the die stamping, additional reverse molds for sandwiching the extruded film form may be provided, in addition to providing a pressure roll in the form of a reverse mold. Moreover, in the modulated surface of the light guide film, the ridge line direction may be substantially parallel to the end face of the light guide film where the rays of light enter from the light source.

INDUSTRIAL APPLICABILITY

As set forth above, according to the present invention, a reduction in thickness of an ultrathin liquid crystal backlight unit may be achieved while suppressing the lack in uniformity of luminance on a liquid crystal display surface of a mobile computer, and therefore the present invention can be suitably applied to, for example, ultraslim computers generally referred to as Ultrabook.

EXPLANATION OF THE REFERENCE SYMBOLS 1 mobile computer, ultraslim computer
2 operation unit
3 liquid crystal display unit
4 liquid crystal panel
5 casing for liquid crystal display unit
6, 43 top plate
7 front face support member
8 hinge part
9 casing for operation unit
11, 31, 41 backlight unit for ultrathin liquid crystal display device
12, 32, 42 light guide film
13 reflection sheet
14 light source
15 optical sheet
16, 33, 44 soft layer
17, 45 back hard layer
18, 46 front hard layer
19, 34, 48 diffusion pattern
20, 47 modulated surface
21 coextruder
22, 23, 24 extruder
25 distribution block
26 multi-manifold die
27, 28 pressure roll

What is claimed is:

1. A light guide film for a backlight unit of an ultrathin liquid crystal display device,
the light guide film allowing rays of light entering from an end face to exit from a front face side,
an entire light guide film having an average thickness of no less than 100 µm and no greater than 600 µm, and
the light guide film comprising a hard layer, the hard layer having a pencil hardness of at least HB, comprising a polycarbonate as a principal component, and having at least one face thereof being exposed,
wherein at least one of a front face and a back face has a wave-like modulated surface, and
wherein an interval between ridge lines of the modulated surface is within a range of no less than 1 mm and no greater than 500 mm.

2. The light guide film according to claim further comprising a diffusion pattern on the back face thereof.

3. A backlight unit for an ultrathin liquid crystal display device, comprising:
a reflection sheet;
the light guide film according to claim 1 overlaid on a front face of the reflection sheet; and
a light source that emits rays of light toward an end face of the light guide film.

4. A mobile computer comprising the backlight unit according to claim 3 in a liquid crystal display unit.

5. The light guide film according to claim 1, wherein
the light guide film further comprises a soft layer laminated on the hard layer,
the soft layer having a pencil hardness of at most 2B, and comprising a transparent resin as a principal component, and
the hard layer has an average thickness of no less than 2 µm and no greater than 100 µm.

6. The light guide film according to claim 5, wherein the transparent resin of the soft layer is a polycarbonate.

7. The light guide film according to claim 5, wherein the hard layer and the soft layer are integrally molded by coextrusion molding.

8. The light guide film according to claim 5, wherein the hard layer is laminated on front and back sides of the soft layer.

9. A light guide film for a backlight unit of an ultrathin liquid crystal display device,
the light guide film allowing rays of light entering from an end face to exit from a front face side,
an entire light guide film having an average thickness of no less than 100 µm and no greater than 600 µm, and
the light guide film comprising a hard layer, the hard layer having a pencil hardness of at least HB, comprising a polycarbonate as a principal component, and having at least one face thereof being exposed,
wherein at least one of a front face and a back face has a wave-like modulated surface, and
wherein an average height of the ridge line with respect to an approximate hypothetical plane of the modulated surface on which a plurality of valley lines run is within a range of no less than 5 µm and no greater than 40 µm.

10. A backlight unit for an ultrathin liquid crystal display device, comprising:
a reflection sheet;
the light guide film according to claim 1 overlaid on a front face of the reflection sheet; and
a light source that emits rays of light toward an end face of the light guide film.

11. A mobile computer comprising the backlight unit according to claim 10 in a liquid crystal display unit.

12. A method for producing a light guide film for a backlight unit of an ultrathin liquid crystal display device, the light guide film allowing rays of light entering from an end face to exit from a front face side, comprising:
a coextrusion step of coextruding a soft layer-forming composition for forming a soft layer and a hard layer-forming composition for forming a hard layer, the soft layer comprising a polycarbonate as a principal component and having a pencil hardness of at most 2B, and the hard layer comprising a polycarbonate as a principal component and having a pencil hardness of at least HB,
the coextrusion step comprising adjusting each amount of extrusion of the soft layer-forming composition and the hard layer-forming composition such that an entire light guide film formed through the coextrusion has an average thickness of no less than 100 µm and no greater than 600 µm and the hard layer formed from the hard layer-forming composition has an average thickness of no less than 2 µm and no greater than 100 µm; and
wherein at least one of a front face and a back face of the light guide film has a wave-like modulated surface; and
wherein an interval between ridge lines of the modulated surfaces is within a range of no less than 1 mm and no greater than 500 mm.

13. A method for producing a light guide film for a backlight unit of an ultrathin liquid crystal display device, the light guide film allowing rays of light entering from an end face to exit from a front face side, comprising:
a coextrusion step of coextruding a soft layer-forming composition for forming a soft layer and a hard layer-forming composition for forming a hard layer, the soft layer comprising a polycarbonate as a principal component and having a pencil hardness of at most 2B, and the hard layer comprising a polycarbonate as a principal component and having a pencil hardness of at least HB, the coextrusion step comprising adjusting each amount of extrusion of the soft layer-forming composition and the hard layer-forming composition such that an entire light guide film formed through the coextrusion has an average thickness of no less than 100 μm and no greater than 600 μm and the hard layer formed from the hard layer-forming composition has an average thickness of no less than 2 μm and no greater than 100 μm, at least one of a front face and a back face of the light guide film having a wave-like modulated surface, and an average height of the ridge line with respect to an approximate hypothetical plane of the modulated surface on which a plurality of valley lines run falling within a range of no less than 5 μm and no greater than 40 μm.

* * * * *